May 10, 1932.   H. J. QUINTRELL   1,857,693
CORE BARREL HAVING CORE RECEPTACLE
Filed Oct. 7, 1929   2 Sheets-Sheet 1
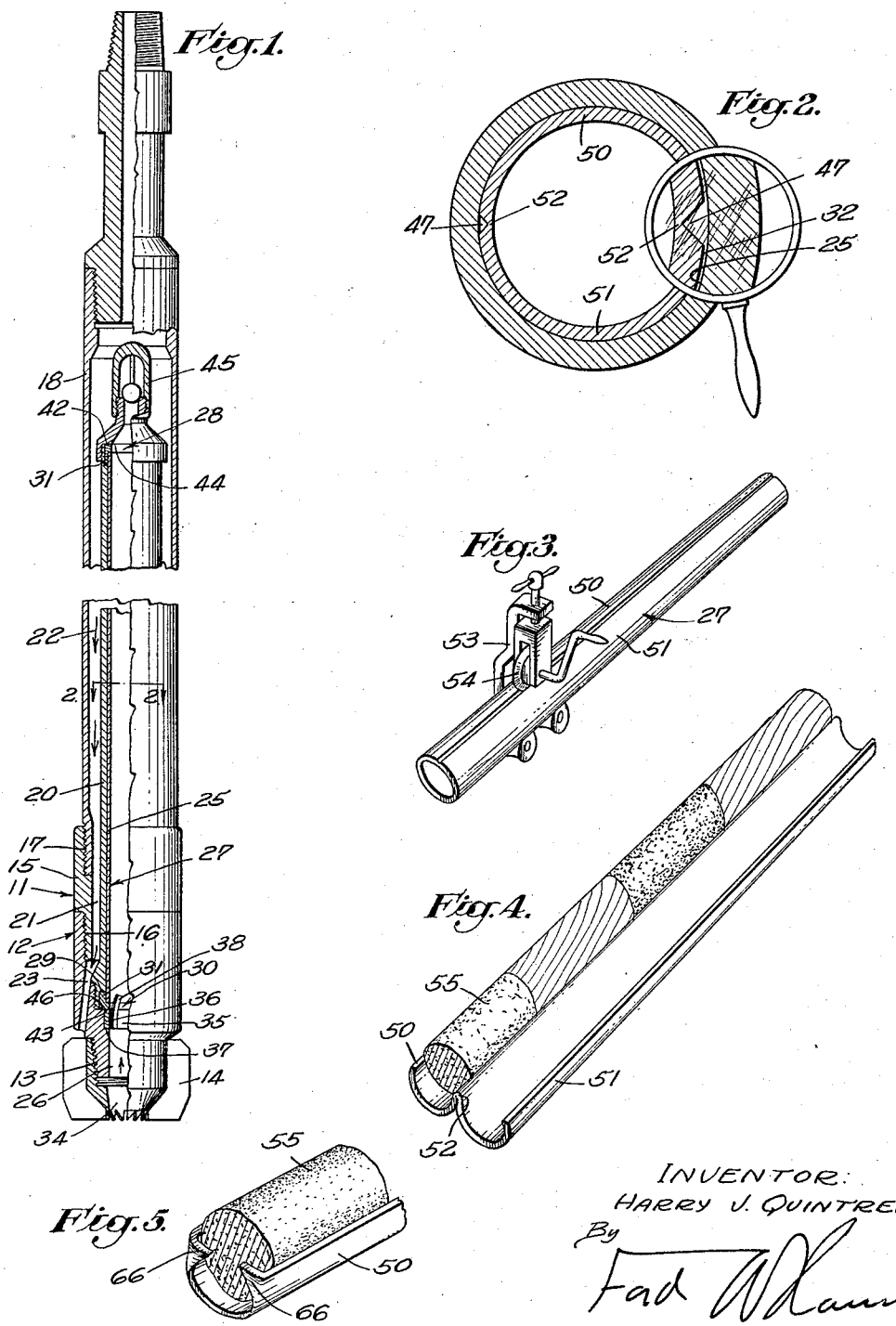
INVENTOR:
HARRY J. QUINTRELL,
By
ATTORNEY.

May 10, 1932.  H. J. QUINTRELL  1,857,693
CORE BARREL HAVING CORE RECEPTACLE
Filed Oct. 7, 1929  2 Sheets-Sheet 2
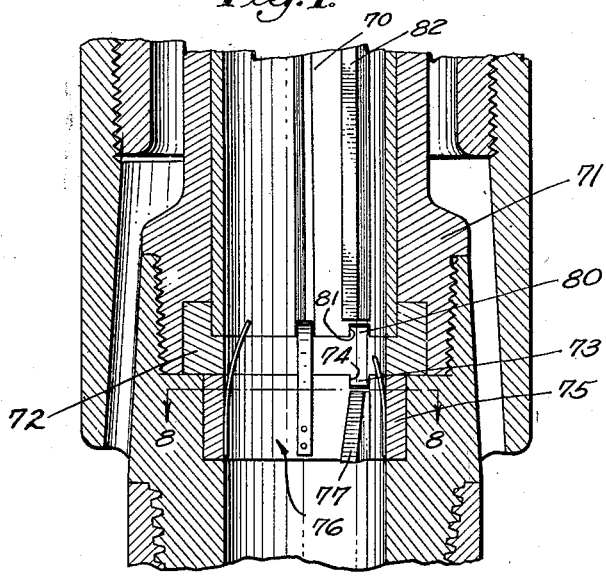
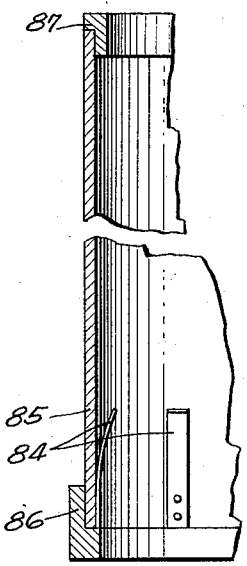
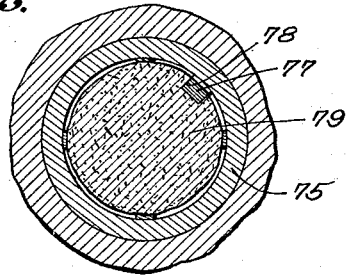
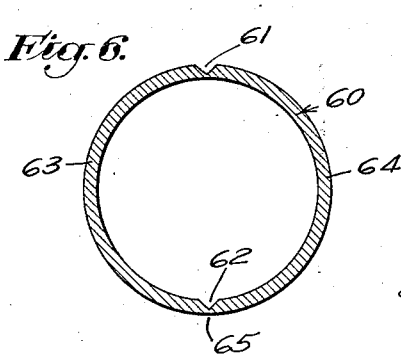
INVENTOR:
HARRY J. QUINTRELL,
By
ATTORNEY Patented May 10, 1932

1,857,693

UNITED STATES PATENT OFFICE

HARRY J. QUINTRELL, OF SOUTH GATE, CALIFORNIA

CORE BARREL HAVING CORE RECEPTACLE

Application filed October 7, 1929. Serial No. 397,885.

This invention relates to earth boring tools having an annular cutter which forms a core during the boring process and has an axial opening therein which receives such core and in which the core is lifted to the surface of the ground.

Core bits of this character are made demountable so that access may be had to the ends of the core receiving recess to permit the core to be forced out, the core being then laid out in trays for inspection and future reference. It is evident that the parts of a core removed from the core recess of a core bit may become disarranged if proper care is not taken. In the use of these core bits it is often found that the core will become frozen or stuck in the core recess so that all efforts to force the core out are ineffectual, making it necessary then to split the inner barrel of the core bit by use of an oxy-acetylene cutting torch. This cutting by use of a torch ruins the inner barrel, and also the heat transmitted to the core will result in changing the characteristics thereof.

My invention has in view a new core bit in which difficulties and disadvantages such as those mentioned above will be entirely overcome, as may be perceived from the following part of the specification.

It is an object of the invention to provide a core bit having an axial core recess and a core receptacle therein adapted to receive the core formed by the core cutter of the core bit, which receptacle may be readily removed from the core bit with the core therein and subsequently separated or unfolded from the core without endwise movement or other disturbance of the core, thus preserving the core exactly as it is obtained from the underground formation penetrated by the core bit.

A further object of the invention is to provide a core bit having a core receiving recess of larger diameter than the core formed by the core cutter and having a thin walled tubular core receptacle in the recess, this receptacle being supported throughout its length by the walls of the core bit which form the recess thereof, but being of sufficiently smaller diameter to permit it to be readily removed, with its contained core, from the recess of the core bit.

A further object of the invention is to form a core receptacle of the above character from cooperating cylindrical portions which may be separated along lines extending longitudinally thereof, it being preferable to form the cooperative cylindrical portions by forming grooves or depressions longitudinally along diametrally opposite sides of a tubular member, the grooves or depressions being of such depth and size that thin interconnecting walls are left between the two semi-cylindrical wall portions defined by the grooves or depressions, such interconnecting walls being readily penetrated by a simple tool so as to divide the core receptacle into semi-cylindrical halves which may be readily separated so as to enable one of such halves to be lifted from the other half and from the core resting in such other half of the core receptacle, this other half then serving as a tray for holding the core in the original condition in which it was cut from the underground formation.

A further object of the invention is to make the core receptacle of such diameter that it may readily relatively rotate within the recess of the core bit, this feature permitting the core receptacle to remain stationary in engagement with the core which extends therethrough while the core bit is being rotated to accomplish the drilling operation, and it is a further object to provide bearing means on the receptacle for thrust bearing engagement with co-operating parts of the core bit.

Further objects and advantages of the invention will appear throughout the following part of the specification and from a consideration of the accompanying drawings, in which:

Fig. 1 is a partly sectioned elevational view of a core bit embodying the features of the invention.

Fig. 2 is an enlarged horizontal cross section on a plane represented by the line 2—2 of Fig. 1, showing in cross section the inner barrel portion of the core bit and a core receptacle therein, a portion of this view being magnified for purpose of bringing out certain details.

Fig. 3 is a perspective view showing a core receptacle, with the core therein, being parted by a simple form of tool adapted for this use.

Fig. 4 is a perspective view showing the core receptacle lying open with the core resting in one of its halves which thereafter constitutes a tray for the core.

Fig. 5 is a fragmentary perspective view showing how the ends of the core tray may be deformed to prevent the core from sliding out the ends thereof.

Fig. 6 shows an alternative method of forming slots or depressions in the tubular core receptacle.

Fig. 7 is an enlarged fragmentary cross sectional view showing the core receptacle equipped with means for positively engaging the core so that such receptacle will be positively held stationary with the core during the operation of the core bit.

Fig. 8 is a horizontal cross section through the core catcher, taken on a plane represented by the line 8—8 of Fig. 7.

Fig. 9 is a fragmentary vertical cross section showing an alternative form of core receptacle equipped with core catchers.

My invention follows in part the customary core bit construction and, as shown in Fig. 1, includes an outer barrel 11 formed of a lower sub 12 which is threaded at 13 to receive a core cutter 14 and has an upper section 15 which makes threaded engagement with the member 12 at 16 and is adapted to be threaded at 17 to the lower end of a drill pipe 18. Extending upwardly from the lower sub 12 and within the member 15 and the lower portion of the drill pipe 18 is an inner barrel 20 which is of such external diameter that an annular water passage 21 is formed therearound through which drilling mud is conducted downwardly, as indicated by arrows 22, to the passages 23 of the lower sub 12, which passages 23 discharge the drilling fluid into the cutting zone of the bit so as to remove cuttings which are formed by the cutter 14. The bore 25 of the inner barrel 20 constitutes an axial cylindrical recess which is of larger diameter than the axial opening 26 through the lower sub 12 and is of larger diameter than the core which the cutter 14 is adapted to form. In the axial recess 25 I place a core receptacle 27 which consists preferably of a light-weight metal tube having an internal diameter slightly greater than the core cut by the cutter 14 so that such core will readily slide thereinto. The external diameter of the tube 27 is slightly smaller than the diameter of the axial recess 25 so that it may be readily slid into and removed therefrom but will make radial bearing engagement with the inner cylindrical face of the inner barrel 20 and may therefore remain stationary with the core which projects thereinto while the core bit is in rotation.

I prefer to equip the core receptacle or tube 27 with thrust bearings which are preferably in the form of counterbored thrust bearing rings 28 and 30, these rings having an internal diameter substantially equivalent to the internal diameter of the tube 27 and having an annular wall portion or cylindrical lip 31 which will fit over an end of the tube 27. In installing the receptacle 27, the external surface thereof is preferably coated with grease or heavy oil which will fill the slight annular space 32 existing between the inner barrel 20 and the core receptacle 27, this grease or oil serving as a lubricant and also filling the annular space 32 in such a manner that the expansive forces or pressures exerted within the receptacle 27 will be transmitted through the grease to the relatively heavy inner barrel 20, thereby resisting expansion of the core receptacle 27.

In the operation of the core barrel, the core moves relatively upwardly through the opening 34 of the cutter 14, the opening 26 of the sub 12, and the core catcher 35 of the core bit into the core receptacle 27. The core catcher 35, in accordance with standard construction, consists of a ring 36 rotatably mounted in a recess or counterbore 37 in the sub 12, and spring fingers 38 which engage the core in a manner to prevent it from dropping out of the core bit when the core bit is lifted.

It is intended that this core catcher 35 shall remain stationary with the core, and it is found in the use of core bits that this occurs except in such instances where the ring 36 of the core catcher 35 becomes stuck in the recess 37. Frictional engagement of the core with the core receptacle 27 may cause the core receptacle to remain stationary therewith, and the accumulation of small cuttings between the outer face of the core and the inner face of the core receptacle may also enter into the frictional engagement of the receptacle by the core, which frictional engagement will cause the core receptacle to remain stationary when it exceeds the frictional characteristics of the annular layer of grease in the annular space 32.

During the rotation of the core bit around the core receptacle 27, held stationary by the core which is entering thereinto, thrust forces exerted in either direction to the core receptacle 27 will be carried by the end bearing faces 42 and 43 of the bearing rings 28 and 30, which bearing faces respectively engage a shoulder or cooperating surface 44 of the core bit valve cap 45 or the shoulder 46 of the sub 12. When a core of desired length has been cut, the core drill is lifted from the hole, the core being carried in the receptacle 27.

At the surface of the ground, the core bit is removed from the drill pipe 18 by breaking the joint, as indicated at 17; the valve cap 45 is then unscrewed from the upper end of the inner barrel 20; and by inserting a bar or pole through the opening 34 of the core cutter 14, the receptacle 27 with its contained core may be pushed out of the axial recess 25, the lower thrust bearing ring 30 remaining in place in the counterbore or recess 29 at the lower end of the inner barrel 20, the upper thrust bearing ring 28 being removed from the core receptacle 27 after removal of the core receptacle from the axial recess 25. When it is desired to clean or replace the lower bearing ring 30, the inner barrel 20 may be unscrewed from the sub 12.

The core receptacle 27, being of thin walled construction, may be readily parted along longitudinal lines so that it may be removed in several parts from around the core without necessity of forcing the core longitudinally from the interior of the receptacle; but, as a feature of my invention, I provide a core receptacle characterized by complementary contributing semi-cylindrical portions which may be readily separated. In the preferred form of the core receptacle 27 I provide, as shown in Fig. 2, longitudinal diametrally opposed grooves or depressions 47 which thereby divide the receptacle 27 into complementary semi-cylinders 50 and 51.

The grooves or depressions 47 are of such depth that the wall of the receptacle is nearly penetrated, leaving a very thin interconnecting wall 52 between the semi-cylinders 50 and 51, which wall, however, is of sufficient strength to hold the parts 50 and 51 operatively together. By use of a simple tool 53, such as indicated in Fig. 3, a rolling cutter disc 54 having a sharp edge may be caused to run along one or both of the grooves 47 so as to penetrate the interconnecting thin walled portion 52 at the bottoms of the grooves, thereby parting the receptacle 27 so that either one of the semi-cylinders 50 or 51 may be removed from the core 55 which is contained within the receptacle 27.

In Fig. 4 I show one half of the receptacle 27, such as the semi-cylinder 51, swung back from the core 55 which is resting within the semi-cylinder 50 which then constitutes a tray for the core 55. In the use of the core receptacle illustrated in Fig. 4, it has been separated or parted only along one groove 47 and has been swung back or hinged on the interconnecting wall 52 at the bottom of the unparted groove, the core 55 lying in one half of the receptacle which then constitutes a tray, the core being disclosed to view and inspection without any possibility of disarrangement from the original condition in which it was obtained from the underground formation.

Whether or not the semi-cylinder 51 is separated from the semi-cylinder 50 is of little consequence as it will be understood that the core receptacle may be parted in one or more places, as desired.

In Fig. 6 I show a core receptacle 60 having an external groove or depression 61 and an internal groove or depression 62 diametrally opposite therefrom. In the use of this core receptacle 60, it is parted by conducting a roller or other parting tool through the external groove 61. The two halves 63 and 64 of the receptacle are then swung or hinged outwardly on the thin wall portion 65, the core remaining in either one of the halves 63 or 64.

As shown in Fig. 5, the corners 66 at the ends of a semi-cylinder core tray, such as the semi-cylinder 50 shown in Fig. 4, may be bent inwardly to obstruct outward movement of the core 55 and thus prevent the core from sliding out of its tray during transportation or the carrying of the core tray and core from the derrick floor to the core rack.

My invention also comprehends a positive engagement of the core by a part of the core receptacle, thereby causing the core receptacle to remain stationary with the core while the remaining parts of the core bit are in rotation. In Fig. 7 I show the lower end of a core receptacle 70 situated within an inner barrel 71 of a core bit, this core receptacle 70 having a bearing ring 72 on the lower end thereof which is equipped with a key or lug 73 extending into a notch 74 in the upper surface of the ring 75 of a core catcher 76.

Aligned with the notch 74, the core catcher 76 has an inwardly projecting slot cutting tool element 77 which cuts a longitudinal slot or groove 78, Fig. 8, in the cylindrical face of a core 79. The engagement of the cutting element 77 with the slot 78 of the core causes a positive engagement of the core catcher 76 so as to hold the core catcher 76 positively against rotation. The bearing ring 72 is held against rotation by reason of the projection of its key 73 into the notch 74 of the core catcher 76, and the bearing ring in turn transfers this non-rotative condition to the core receptacle 70 through an upwardly extending lug 80 which projects upwardly into a notch 81 in the lower end of the receptacle 70. In alignment with the slot or groove cutting element 77 of the core catcher 76, the receptacle 70 carries an inwardly projecting key or rib 82 over which the slot 78 of the core 79 slides as the core moves upwardly within the receptacle 70. It is evident that in this form of the invention the keyed engagement of the core by the core receptacle eliminates any possibility of the various portions of the core being disarranged or broken up, a perfect core being always obtained and likewise an accurate record being always secured. In the disclosure of this preferred form of the invention I have employed a core bit having an outer barrel and an inner barrel so that annular water passages are formed between the outer and inner barrels and an axial recess is provided in the inner barrel for holding a core receptacle.

The practice of the invention is not confined to this construction, for a core bit body may be formed with a single tubular wall providing an axial cylindrical recess for a core receptacle and having holes extending within the single wall thereof for carrying the drilling fluid down to a core cutter at the lower end of the core bit.

In the previous forms of the invention I have shown the core receptacle separate from the core catcher, but, as shown in Fig. 9, the invention comprehends the elimination of a separate core catcher and the placing of flexible fingers 84 in the lower end of a core receptacle 85 so that such core receptacle 85 will be equipped with means for holding the core. On the lower end of the core receptacle I have shown a thrust bearing ring 86 of the same form as illustrated in Figs. 1 and 7, but at the upper end of the core receptacle 85 I show a thrust bearing ring 87 having an internal cylindrical lip which fits into the upper end of the core receptacle, making it possible to slide the bearing ring 87 in and out of the axial recess in which the core receptacle is adapted to be held.

I have herein shown my invention in simple and practical form, but it is recognized that certain parts or elements thereof are representative of other parts, elements, or mechanisms which may be employed in substantially the same manner to accomplish substantially the same results; therefore, it is to be understood that the invention is not to be limited to the details disclosed herein but shall have the scope set forth in the following claims.

I claim as my invention:

1. A core drill of the character described, including: a tubular member having walls forming an axial opening, means whereby it may be rotated, and a cutter at its lower end for forming a core; a tubular core receptacle in said axial opening for receiving the core formed by said cutter, said core receptacle being of such smaller size than said opening that it may be readily removed therefrom, and bearing means provided for the engagement of said core receptacle with an interior portion of said tubular member.

2. A core drill of the character described, including: a tubular member having walls forming an axial opening, means whereby it may be rotated, and a cutter at its lower end for forming a core; a tubular core receptacle in said axial opening for receiving the core formed by said cutter, said core receptacle being of such smaller size than said opening that it may be readily removed therefrom; and thrust bearing means on said core receptacle having thrust bearing engagement with an interior portion of said tubular member.

3. A core drill of the character described, including: a tubular member having walls forming an axial opening, means whereby it may be rotated, and a cutter at its lower end for forming a core; a tubular core receptacle in said axial opening for receiving the core formed by said cutter, said core receptacle being supported at a plurality of points throughout its length by the walls of said tubular member which form said axial opening; and thrust bearing means on said core receptacle having thrust bearing engagement with an interior portion of said tubular member.

4. A core drill of the character described, including: a tubular member having walls forming an axial opening, means whereby it may be rotated, and a cutter at its lower end for forming a core; a tubular core receptacle in said axial opening for receiving the core formed by said cutter, comprising cooperating cylindrical portions separable so as to be removed from the sides of said core, said core receptacle being supported at a plurality of points throughout its length by the walls of said tubular member which form said axial opening; and thrust bearing means on said core receptacle having thrust bearing engagement with an interior portion of said tubular member.

5. A core drill of the character described, including: a tubular member having walls forming an axial opening, means whereby it may be rotated, and a cutter at its lower end for forming a core; and a tubular core receptacle in said axial opening for receiving the core formed by said cutter, said core receptacle having relatively thin wall sections and having engagement with the interior walls of said tubular member by radial bearing means at a plurality of points throughout its length.

6. A core drill of the character described, including: a tubular member having walls forming an axial opening, means whereby it may be rotated, and a cutter at its lower end for forming a core; and a tubular core receptacle in said axial opening for receiving the core formed by said cutter, comprising cooperating cylindrical portions separable so as to be removed from the sides of said core, said core receptacle having relatively thin wall sections and having engagement with the interior walls of said tubular member by radial bearing means at a plurality of points throughout its length.

7. A core drill of the character described, including: a tubular member having walls forming an axial opening, means whereby it may be rotated, and a cutter at its lower end for forming a core; and a tubular core receptacle in said axial opening for receiving the core formed by said cutter, said core receptacle having grooves or depressions extending the length thereof whereat it may be readily parted so as to be separated from around said core after said receptacle with its contained core has been removed from said tubular member, and said core receptacle being of such smaller size than said opening that it may be readily removed therefrom.

8. A core drill of the character described, including: a tubular member having walls forming an axial opening, means whereby it may be rotated, and a cutter at its lower end for forming a core; and a tubular core receptacle in said axial opening for receiving the core formed by said cutter, said core receptacle having grooves or depressions extending the length thereof whereat it may be readily parted so as to be separated from around said core after said receptacle with its contained core has been removed from said tubular member, and said core receptacle being supported at a plurality of points throughout its length by the walls of said tubular member which form said axial opening.

9. A core drill of the character described, including: a tubular member having walls forming an axial opening, means whereby it may be rotated, and a cutter at its lower end for forming a core; and a tubular core receptacle in said axial opening for receiving the core formed by said cutter, said core receptacle having grooves or depressions extending the length thereof whereat it may be readily parted so as to be separated from around said core after said receptacle with its contained core has been removed from said tubular member, and said core receptacle having relatively thin wall sections and having radial bearing engagement with the interior walls of said tubular member at a plurality of points throughout its length.

10. A core drill of the character described, including: a tubular member having walls forming an axial opening, means whereby it may be rotated, and a cutter at its lower end for forming a core; a tubular core receptacle in said axial opening for receiving the core formed by said cutter, said core receptacle being of such smaller size than said opening that it may be readily removed therefrom; and positive means carried by said core receptacle for holding said core receptacle stationary with said core while said tubular member is rotated.

11. A core drill of the character described, including: a tubular member having walls forming an axial opening, means whereby it may be rotated, and a cutter at its lower end for forming a core; a tubular core receptacle in said axial opening for receiving the core formed by said cutter, said core receptacle having relatively thin wall sections and having radial bearing engagement with the interior walls of said tubular member at a plurality of points throughout its length; and positive means carried by said core receptacle for holding said core receptacle stationary with said core while said tubular member is rotated.

12. A core drill of the character described, including: a tubular member having walls forming an axial opening, means whereby it may be rotated, and a cutter at its lower end for forming a core; a tubular core receptacle in said axial opening for receiving the core formed by said cutter, said core receptacle having grooves or depressions extending the length thereof whereat it may be readily parted so as to be separated from around said core after said receptacle with its contained core has been removed from said tubular member, and said core receptacle having relatively thin wall sections and having radial bearing engagement with the interior walls of said tubular member at a plurality of points throughout its length; and positive means carried by said core receptacle for holding said core receptacle stationary with said core while said tubular member is rotated.

13. A core drill of the character described, including: walls forming an outer barrel having means at its upper end whereby it may be rotated; walls forming an inner barrel extending upwardly within said outer barrel, said inner barrel having an axial opening; a cutter at the lower end of said core drill for forming a core in alignment with and smaller than said axial opening of said inner barrel; and a core receptacle in said opening consisting of a thin walled tube having an external diameter approximately that of the internal diameter of said axial opening but being sufficiently smaller than said axial opening to permit ready removal thereof from said opening when said core drill is dismantled, said tube being comprised of cylindrical portions separable along previously weakened longitudinal sections so that it may be readily removed from said core.

14. A core drill of the character described, including: walls forming an outer barrel having means at its upper end whereby it may be rotated; walls forming an inner barrel extending upwardly within said outer barrel, said inner barrel having an axial opening; a cutter at the lower end of said core drill for forming a core in alignment with and smaller than said axial opening of said inner barrel; and a core receptacle in said opening consisting of a thin walled tube having an external diameter approximately that of the internal diameter of said axial opening but being sufficiently smaller than said axial opening to permit ready removal thereof from said opening when said core drill is dismantled, said tube having longitudinal grooves or depressions therein whereat it may be readily parted and removed from around said core.

15. A core receptacle for use in a core bit having an axial cylindrical chamber of larger diameter than the core formed by the core cutter of the bit, comprising: a thin walled tube having an external diameter approximately that of the internal diameter of said axial chamber but being sufficiently smaller than said chamber as to be readily removed therefrom, there being grooves or depressions formed longitudinally in said tube adapting said tube for ready parting and separation from around the core.

16. A core drill of the character described, including: a tubular member having walls forming an axial opening, said tubular member provided with means whereby it may be rotated, and a cutter at its lower end for forming a core; a tubular core receptacle in said axial opening for receiving the core formed by said cutter, said core receptacle being of such smaller size than said opening that it may be readily removed therefrom; thrust bearing means on said core receptacle having thrust bearing engagement with said tubular member; and holding means independent of said receptacle for retaining said core therein, said holding means adapted to allow the upward movement of said core but preventing its downward movement.

17. A core drill of the character described, including: a tubular member having walls forming an axial opening, said tubular member provided with means whereby it may be rotated, and a cutter at its lower end for forming a core; a tubular core receptacle in said axial opening for receiving the core formed by said cutter, said core receptacle being of such smaller size than said opening that it may be readily removed therefrom; thrust bearing means on said core receptacle having thrust bearing engagement with said tubular member; and holding means independent of said receptacle for retaining said core therein, said holding means comprising spring fingers adapted to engage the section of said core within said receptacle.

18. As an article of manufacture, a tubular core receptacle having a thin metal wall, said wall having one or more longitudinal grooves therein to permit ready parting of said wall along one of said grooves.

19. As an article of manufacture, a thin-walled core receptacle having a longitudinal chamber, said core receptacle having longitudinal grooves therein to permit the ready parting of said wall longitudinally along one of said grooves.

20. As an article of manufacture, a thin-walled core receptacle having a longitudinal chamber, said wall having previously weakened longitudinal sections to permit the ready parting of said wall longitudinally.

In testimony whereof, I have hereunto set my hand at Los Angeles, California, this 1st day of October, 1929.

HARRY J. QUINTRELL.